(No Model.)

W. H. FULLER.
PHOTOGRAPHIC CAMERA.

No. 436,347. Patented Sept. 16, 1890.

WITNESS:
C. R. Ferguson
Wm. M. Iliff

INVENTOR
Willard H. Fuller
BY Gifford H. Brown
HIS ATTORNEYS

UNITED STATES PATENT OFFICE.

WILLARD H. FULLER, OF PASSAIC, NEW JERSEY, ASSIGNOR TO THE SCOVILL & ADAMS COMPANY, OF NEW YORK, N. Y.

PHOTOGRAPHIC CAMERA.

SPECIFICATION forming part of Letters Patent No. 436,347, dated September 16, 1890.

Application filed February 13, 1890. Serial No. 340,300. (No model.)

*To all whom it may concern:*

Be it known that I, WILLARD H. FULLER, of Passaic, county of Passaic, and State of New Jersey, have invented a certain new and useful Improvement in Photographic Cameras, of which the following is a specification.

This camera is of the class known as a "magazine-camera," in which a number of plates may be inserted and exposed successively.

I will describe a camera embodying my improvement, and point out the novel features in the claims.

Figure 1:
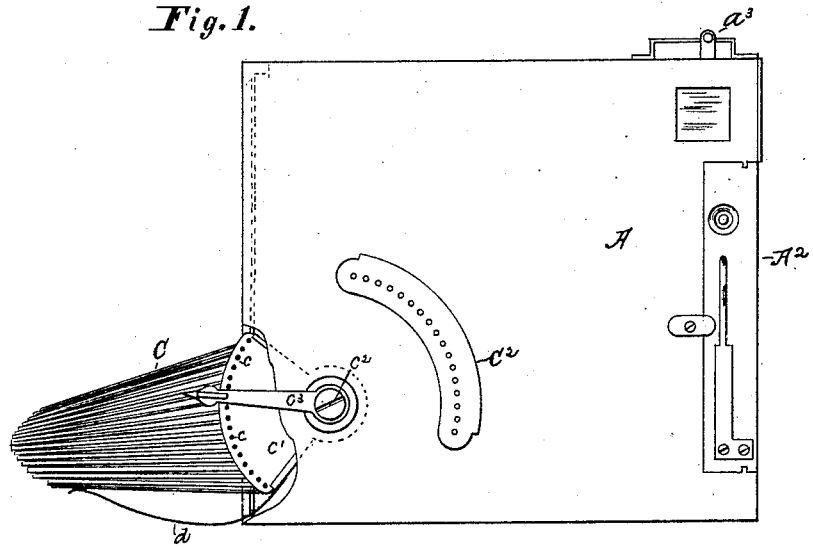
Figure 3:
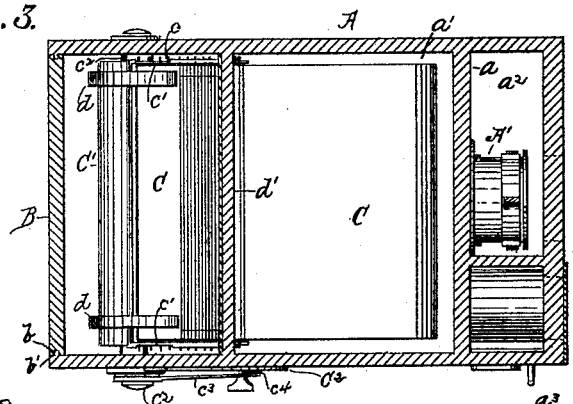
Figure 2:
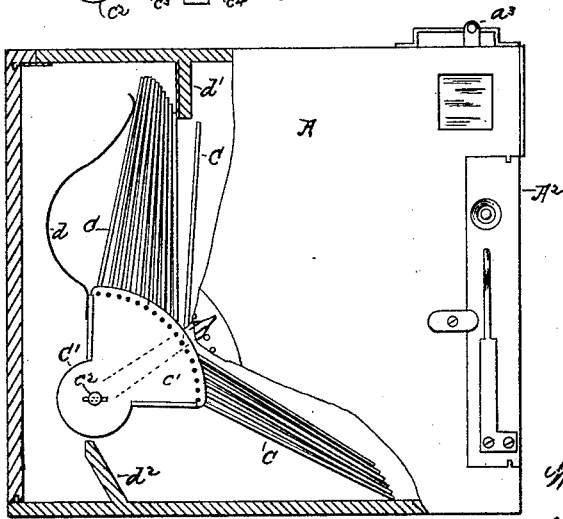

In the drawings, Figure 1 is a side view of a camera embodying my improvement, with the back removed and a portion of the case broken away, showing the plate-holders in one position. Fig. 2 is a view similar to Fig. 1, but showing the plate-holders in another position; and Fig. 3 is a top or plan view with the top of the case removed.

Similar letters indicate like parts in all the figures of the drawings.

Referring by letter to the drawings, A designates a camera case or body having a vertical partition $a$, dividing the case into two chambers $a'$ $a^2$. A lens-tube A' extends through the partition $a$, and is adjustable by means of a fulcrumed lever engaging with the tube and having a finger-piece $a^3$ at the top of the camera-body.

$A^2$ is a sliding front, to which a shutter mechanism is attached; but as the shutter mechanism does not form a part of this invention further description or illustration thereof is not deemed necessary.

B is the back of the camera-body. This back is provided in its side and bottom edges with a channel $b$, engaging with ribs $b'$ on the camera-body. This back B may be drawn upward when it is desired to change or remove plates within the chamber $a'$.

C designates a series of plate-holders, consisting, preferably, of thin sheet metal having inwardly-turned side edges to engage over the edges of plates or films. These plate-holders are provided at their lower edges with trunnions $c$, which engage and turn in bearings in a rotary part C', which may be rotated to expose plates or films in succession.

The rotary part C' consists of segmental bearing-plates $c'$, rigidly mounted on a shaft $c^2$, having bearings in the camera-body. One end of the shaft $c^2$ is extended through a side of the camera-body, and is provided with an operating-arm $c^3$.

The arm $c^3$ is of resilient material, and is provided on its inner side with a pin $c^4$, designed to engage in one of a series of perforations in an index-plate $C^2$, secured to the outer side of the camera-body. The perforations in the index-plate are arranged in a series concentric with the shaft $c^2$, and the plate may be provided with figures or characters in a radial line with the perforations to indicate the plate-holder, which is in position to expose a plate.

The plate-holders C have their pivoted connection with the rotary part concentric with the shaft $c^2$, and curved springs $d$ are secured at one end to the rotary part and have their free ends bearing upon the back of the rear plate-holder of the series. These springs and the back B, against which they bear, serve to maintain the plate-holders in the rear of the holder upon which a plate or film is ready for exposure in a substantially vertical position.

To illustrate the operation, it will be presumed that the first or front plate-holder of the series is in position for an exposure, with its upper edge resting against a stop $d'$, arranged in the top or upper portion of the camera-body. After the exposure shall have been made the arm $c^3$ is turned to bring its pin in engagement with the perforation next in the series. This movement of the arm moves the rotary part carrying the pivotal point of the first plate-holder below its original longitudinal plane, thus allowing the upper edge of the plate-holder to pass beneath the stop $d'$, and the plate-holder turns downward within the chamber $a'$, with the exposed plate or film underneath, so that it cannot be further acted upon by subsequent exposures. As the first plate-holder is turned forward, the next holder of the series is placed in position for exposure. This operation may be repeated until all the plates are exposed.

A flange $d^2$ extends upward from the bottom of the camera-body to the under side of the rotary part, so that the flange, the rotary part, and the plate-holder in position for exposure form in effect a partition to exclude light from the plates on the rear plate-holders when light is admitted through the lens.

Having described my invention, what I claim is—

1. In a camera, the combination, with a camera-body, of a rotary part, a series of plate-holders pivoted to the rotary part concentric with its bearings, and a stop within the camera-body, all of the plate-holders in the rear of the plate under exposure being substantially vertical, substantially as specified.

2. In a camera, the combination, with a camera-body, of a rotary part having a shaft extended through a side of the camera-body, a series of plate-holders having pivotal connection with the rotary part concentric with the bearings of the rotary part, a stop for the plate-holders, and an operating-arm on the extended shaft adapted to engage in perforations, substantially as specified.

3. In a camera, the combination, with a camera-body, of a segmental rotary part, a series of plate-holders having pivotal connection with the rotary part concentric with its bearings, an arm for operating the rotary part, and springs bearing against the rear plate-holder of the series, substantially as specified.

4. The combination, with a camera-body, of a rotary part, a series of plate-holders pivoted thereto, all of the plate-holders having their pivotal connection with the rotary part concentric with the bearings of said rotary part, and a flange in the lower part of the camera-body, the said rotary part, flange, and a plate-holder forming a partition to exclude light from plates in the rear of the plate being exposed, substantially as specified.

5. In a camera, the combination of a part movable around or about an axis, a stop, and a series of plate-holders, all connected to said movable part concentric with its bearings, so as to be carried by it successively against and past the stop, substantially as specified.

WILLARD H. FULLER.

Witnesses:
EDWIN H. BROWN,
K. L. BRENNAN.